United States Patent [19]

Demick

[11] Patent Number: 5,613,732
[45] Date of Patent: Mar. 25, 1997

[54] VEHICLE SEAT ARMREST INCORPORATING A TRANSMITTER UNIT FOR A GARAGE DOOR OPENING SYSTEM

[75] Inventor: Robert L. Demick, Eastpointe, Mich.

[73] Assignee: Hoover Universal, Inc., Plymouth, Mich.

[21] Appl. No.: 310,548

[22] Filed: Sep. 22, 1994

[51] Int. Cl.⁶ .............................. A47C 7/62; A47C 7/72
[52] U.S. Cl. .............................. 297/188.16; 297/188.19; 297/217.1
[58] Field of Search ......................... 297/188.16, 188.14, 297/188.15, 188.19, 188.13, 217.1, 217.3; 296/153, 37.14; 361/600, 679, 725

[56] References Cited

U.S. PATENT DOCUMENTS

| | | |
|---|---|---|
| 1,914,721 | 6/1933 | Isaif ................................. 297/188.19 |
| 2,797,739 | 7/1957 | Orsini . |
| 3,936,833 | 2/1976 | Bush . |
| 4,040,659 | 8/1977 | Arnold . |
| 4,052,103 | 10/1977 | Steinthal . |
| 4,241,870 | 12/1980 | Marcus . |
| 4,247,850 | 1/1981 | Marcus . |
| 4,286,262 | 8/1981 | Wahl . |
| 4,783,037 | 11/1988 | Flowerday . |
| 5,184,132 | 2/1993 | Baird . |
| 5,246,269 | 9/1993 | DeBoer et al. .................... 297/113 |

FOREIGN PATENT DOCUMENTS 3721447  11/1987  Germany ........................ 297/188.15

*Primary Examiner*—Peter M. Cuomo
*Assistant Examiner*—Anthony D. Barfield
*Attorney, Agent, or Firm*—Harness, Dickey & Pierce, P.L.C.

[57] ABSTRACT

An arrangement for mounting a transmitter unit for a garage door opening system within a vehicle seat armrest having at least one soft side, the armrest including a horizontally extending cavity, with access to the cavity being had by opening a cover flap formed in the trim material of the armrest, the transmitter unit being mounted in an cassette which facilitates inserting the transmitter unit into the cavity and positions the transmitter unit within the cavity with the operating switch of the transmitter unit located at the soft side of the armrest to permit operation of the transmitter unit by squeezing the armrest in the proximity of the transmitter unit operating switch.

6 Claims, 2 Drawing Sheets

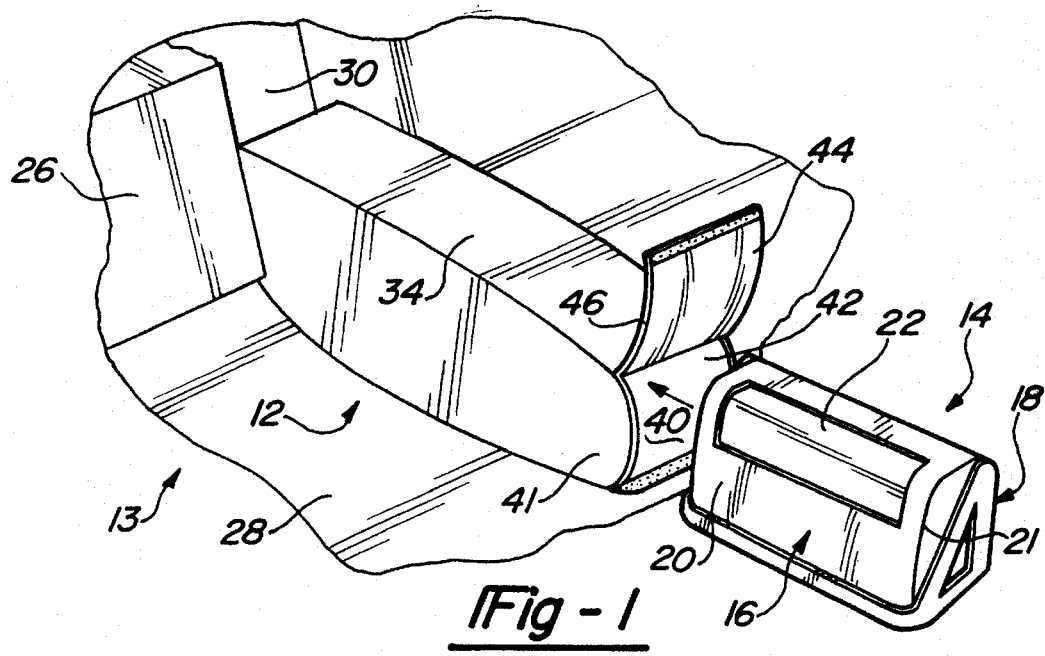
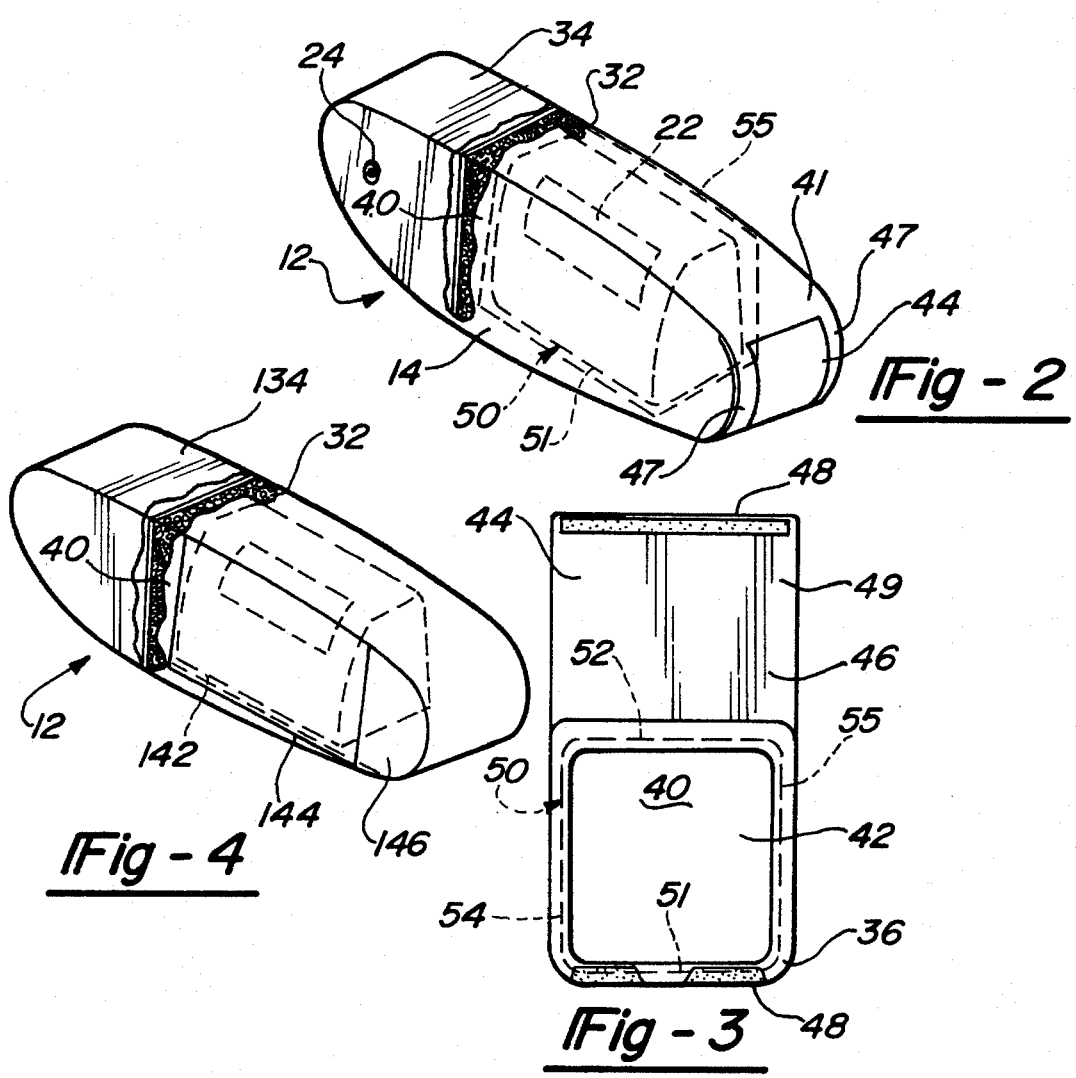

5,613,732

VEHICLE SEAT ARMREST INCORPORATING A TRANSMITTER UNIT FOR A GARAGE DOOR OPENING SYSTEM

BACKGROUND OF THE INVENTION

This invention relates to accessories for motor vehicles, and more particularly, to an arrangement for incorporating a transmitter unit for a garage door opening system in the armrest of the front seat of a motor vehicle.

Most transmitter units for garage door opening systems are hand-held, battery operated units. Many drivers store the transmitter units in the glove compartment of the vehicle or place them on the dashboard when the transmitter unit is not being used.

Various arrangements have been proposed for mounting garage door opener transmitter units in a motor vehicle in a location that is convenient for access by the driver and yet is inconspicuous and out of the way. Generally, transmitter units for garage door opening systems are provided with clips or brackets for making it possible to attach the transmitter units to the vehicle at selected locations within the passenger compartment, the mounting place that is used most frequently being the sun visor. Although the transmitter unit itself is a relatively small, light-weight device, the batteries which provide power for the transmitter unit add considerably to the weight of the transmitter unit. Accordingly, when mounted on the sun visor, the transmitter unit places a load on the mechanism that is relied on to hold the visor in its stored position. Also, because the sun visor is the conventional location for such transmitter units, the transmitter units are at a high risk to be stolen.

Other arrangements mount the transmitter unit on or beneath the dashboard of the vehicle. However, locating the transmitter unit on the dashboard exposes the transmitter unit and its battery to sun rays and heat which results in shortening of the lifetime of the battery. If the transmitter unit is located beneath the dashboard, the operation and/or effectiveness of the transmitter unit may be impaired. In either case, the transmitter unit is exposed to view for theft and the transmitter unit may be inadvertently misplaced unless it is secured to some surface of the vehicle.

In yet other arrangements, the transmitter unit is incorporated into the rear view mirror. However, generally this location is too high for the transmitter unit to be effective at all times as the vehicle approaches the garage. Moreover, such arrangements provide fixed mounting and as such do not provide for aiming of the transmitter unit in the direction of the receiver.

SUMMARY OF THE INVENTION

The present invention provides an arrangement for incorporating a transmitter unit for a garage door opening system in the armrest of the front seat of a motor vehicle. In accordance with the invention, the transmitter unit is mounted in a cavity formed in the interior of the armrest with its operating switch accessible to a soft side of the armrest so that the transmitter unit can be operated by squeezing the armrest in the proximity of the transmitter unit operating switch.

In accordance with a feature of the invention, the cavity is molded into the foam material that forms the core or body of the armrest. Access to the interior cavity of the armrest is provided by means of a flap formed in the trim material of the armrest at its front end. In an alternative arrangement, the interior cavity opens at one side of the armrest. The transmitter unit is mounted in a cassette which facilitates insertion of the transmitter unit into the cavity of the foam core of armrest. The cassette positions the transmitter unit in the armrest cavity with its operating switch located at the soft side of the armrest to permit activation of the transmitter unit through the side of the armrest.

The present invention provides a mounting arrangement for a garage door opener transmitter wherein the transmitter unit is less susceptible to theft or misplacement because the transmitter unit is located within the armrest and is thus out of view. Moreover, because the transmitter unit is located away from the front window of the vehicle, the battery that provides power for the transmitter unit is less affected by environmental conditions. Consequently, the mounting and storage arrangement for a transmitter unit according to the present invention results in extended battery life for the battery used to power the transmitter unit.

The invention consists of certain novel features and structural details hereinafter fully described, illustrated in the accompanying drawings, and particularly pointed out in the appended claims, it being understood that various changes in the details may be made without departing from the spirit, or sacrificing any of the advantages of the present invention.

DESCRIPTION OF THE DRAWINGS

FIG. 1 is a perspective view illustrating a motor vehicle seat armrest that is adapted to receive a transmitter unit for a garage door opening system, the transmitter unit being shown prior to being positioned within the armrest;

FIG. 2 is a view similar to FIG. 1 and illustrating the transmitter unit positioned within the armrest;

FIG. 3 is an end view of the armrest with the cover flap in the open position, showing the interior cavity of the armrest;

FIG. 4 is a perspective view illustrating a motor vehicle seat armrest that is adapted to receive a transmitter unit for a garage door opening system and having a side opening to permit positioning of the transmitter assembly within the armrest;

DESCRIPTION OF THE PREFERRED EMBODIMENTS

Figure 5:
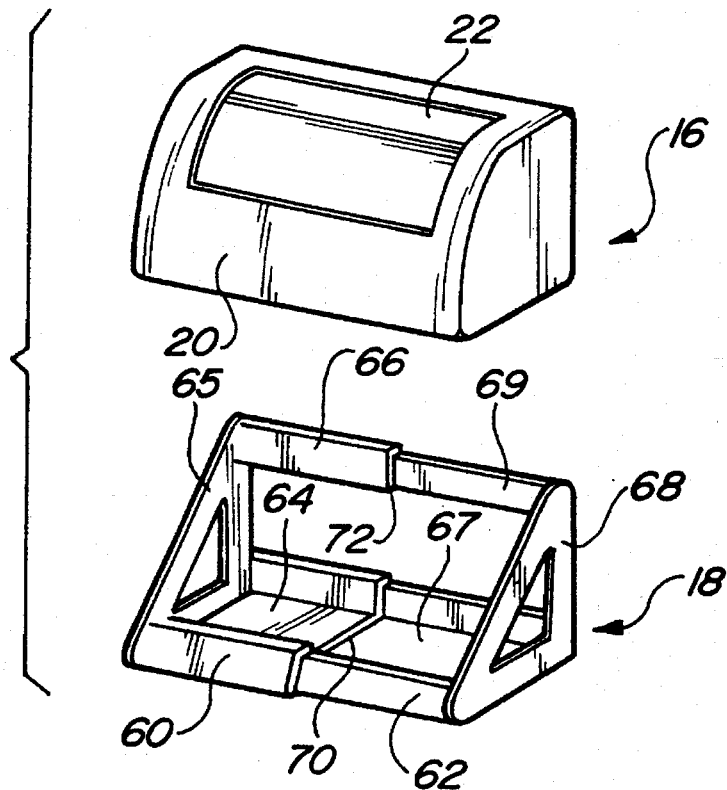
FIG. 5 is an exploded view of a transmitter assembly including a transmitter unit and a cassette provided by the present invention.

Referring to FIG. 1 of the drawings, an armrest 12 for the front seat 13 of a motor vehicle is adapted to receive a transmitter assembly 14 in accordance with the invention. The transmitter assembly 14 includes a transmitter unit 16 for a garage door opening system and an adapter or cassette 18. The transmitter unit 16 is a conventional device and comprises a housing 20 containing suitable electrical circuitry and an operating switch 22 operable to cause the electrical circuitry to produce a signal for which is effective to actuate a control mechanism that is mounted on a garage for causing a garage door to open and close. In the exemplary embodiment, the transmitter unit operating switch 22 is an elongated, generally rectangular shaped pushbutton that is located on one side 21 of the housing and extends substantially the entire length of the side 21.

More specifically, with reference to FIGS. 1–3, the armrest 12 is disposed at the center of the vehicle front seat 13 which includes having a seat back 26 and a seat cushion 28. The armrest includes a support structure including a pivot 24 that mounts the armrest in cantilever fashion from the seat back as is conventional in the art. The pivot mounting permits the armrest to be pivoted about a horizontal axis upwardly and rearwardly into a recess 30 in the seat back to permit seating on the entire width of the seat. In FIG. 1, the armrest is shown in its use position in which it extends forwardly from the front seat back 26 overlying the seat cushion 28 and in which position, the operation of the transmitter unit of the garage door opening system is most effective. The armrest 12 is designed to be pivoted for storage in the recess 30 between the two seat back portions in the manner known in the art, and may be raised upwards from its use position, or lowered from its stored position when it is desired to operated the transmitter unit.

The armrest includes a foam core 32 that forms the body of the armrest and trim cover material 34 that covers the foam core 32 in the conventional manner. The foam core 32 of the armrest includes a molded in interior cavity or compartment 40 having an opening 42 at the forward end 41 of the armrest 12. The cavity 40 is generally elongated and extends axially of the armrest from near the front end 41 of the armrest towards the rear of the armrest. The portion of the trim material at the front of the armrest is cut away on three sides from the main portion of the trim material, defining a generally rectangular cover flap 44 of trim material at the front of the armrest which depends by its upper edge 43 from the front upper edge 45 of the trim cover material and which serves as a cover for closing the opening 42. The cover flap 44 has a foam backing 46. The flap 44 includes a joint seam or a decorative stitch 47 extending along its peripheral edge which serves as decorative trim for the flap, and thus for the front end of the armrest, and also conceals the presence of the flap. The flap 44 is held in place in its closed condition, as shown in FIG. 2, in a suitable manner such as by hook and loop material 48 disposed on the lower rear edge 49 of the flap 44 and on the lower front edge 36 of the main portion of the trim cover material at the front lower edge of the cavity.

The armrest includes a frame member 50, shown in FIGS. 2 and 3, which is located in the interior cavity 40 of the armrest to facilitate insertion of the transmitter assembly into and removal from the cavity 40. The frame has a bottom 51, a top 52 and a pair of sides 54 and 55, at least one side 54 of which is open over most of its extent. The open frame construction allows side 54 to be open so that the operating switch 22 of the transmitter unit 16 is accessible to the soft side cover of the armrest. The bottom 51 defines a guide surface that facilitates sliding movement of the transmitter assembly 14 as it is being slide into and out of the interior cavity of the armrest. However, support for the transmitter assembly may be provided solely by the foam core which forms the body of the armrest.

Access to the interior cavity 40 is provided by the cover flap 44 of the trim cover material which is movable between an open position illustrated in FIG. 1 and a closed position illustrated in FIG. 2. The opening 42 at the forward end 41 of the armrest permits the transmitter assembly 14 to be inserted into the armrest interior cavity 40 which is dimensioned to removably receive the transmitter assembly 14. The cover flap 44 is drawn down over the opening 42 to close the opening 42 after the transmitter assembly is positioned within the cavity.

Referring to FIG. 4, in accordance with an alternative embodiment, access to the interior cavity 40 of the armrest 12 is provided by a side opening 142. In this embodiment, the interior cavity 40 opens to one side 146 of the armrest, and a portion 144 the trim cover material 134 on the side 146 of armrest is cut along three edges to form a flap which is movable between an open position in which access is provided to the interior cavity 40 and a closed position in which the cavity is hidden from view, as has been described for the embodiment for the front opening armrest illustrated in FIGS. 1–3.

Figure 6:
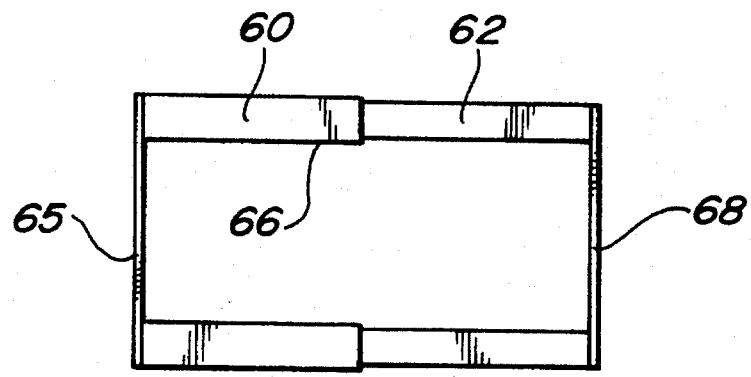
FIG. 6 is a front elevation view of the cassette for the transmitter assembly provided by the present invention.
Figure 7:
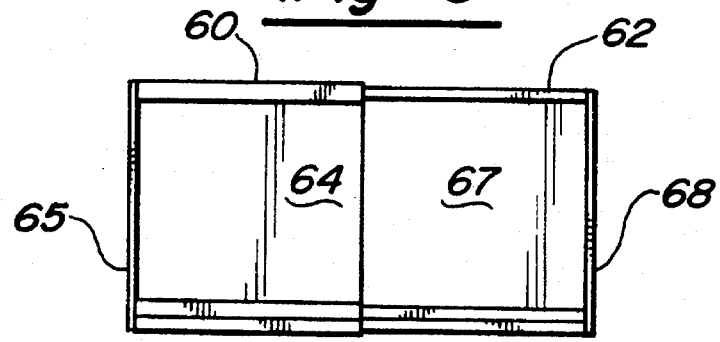
FIG. 7 is a plan view of the cassette for the transmitter assembly.

Referring to FIGS. 5–7, the cassette 18 is an adjustable holder because garage door opening transmitter units currently have various shapes and shapes and sizes. In the exemplary embodiment, the cassette is adjustable lengthwise to correspond to the length of the housing 20 of the transmitter unit 16. To this end, the cassette 18 is formed of two pads 60 and 62 which are adapted to slide axially relative to one another to provide adjustment from front to back, in the length of the cassette. Part 60 has a base portion 64, a triangularly shaped end plate 65 extending upwardly from the base portion 64, and an inwardly directed arm 66. Part 62 includes a base portion 67, a triangularly shaped end plate 68 extending upwardly from the base portion 68, and an inwardly directed arm 69. The base portion 64 and the arm 66 of part 62 are adapted to receive the base portion 67 and the arm 69 of part 62 in telescoping engagement, there being a slot 70 formed in the base portion 64 and a groove 72 formed in the arm, to permit adjustment in the length, that is the spacing between the end plates 65 and 68. Alternatively, the cassette 18 may be adapted to be adjustable widthwise or both lengthwise and widthwise to accommodate a wider variety of transmitter units. Moreover, the cassette 18 may be a one-piece frame member and include adjustable inserts mounted on the frame member and movable therealong to engage the transmitter unit to hold the transmitter unit snug within the cassette.

To mount the transmitter unit 16 within the armrest 12, the transmitter unit is positioned in the cassette 18 and the cassette is adjusted to the length of the housing of the transmitter unit. Then, the cover flap 44 at the front of the armrest 12 is opened to provide access to the interior cavity 40 and the transmitter assembly 14 is slid into the interior cavity of the armrest through the opening with the switch located at side. The cover flap 44 is then closed to conceal the transmitter assembly within the armrest.

The cassette locates the transmitter unit 16 within the armrest of the vehicle front seat 13, with its operating switch 22 located accessibly to the soft side of the armrest. This allows operation of the transmitter unit by squeezing the sides of the armrest between thumb and fingers. If necessary, the armrest can be tilted upwards from its horizontal use position to aim the beam towards the receiver mounted on or in the garage.

Thus it has been shown that the present invention provides an arrangement for mounting a transmitter unit for a garage door opening system in a cavity formed in the armrest of the front seat of a vehicle. The armrest presents a soft sided, pliable enclosure for the transmitter unit and the transmitter unit is mounted in the cavity of the armrest with its operating switch accessible to the soft side of the armrest. The transmitter unit is mounted in a cassette which facilitates insertion of the transmitter unit into and removal from the cavity of the armrest, access to the interior cavity of the armrest being provided by means of a flap formed in the trim material of the armrest at its front end. The, cassette positions the transmitter unit in the armrest cavity with its operating switch located at one side of the armrest for permitting the transmitter unit to be actuated by the operator of the vehicle squeezing the sides of the armrest in the proximity of the operating switch. The transmitter unit is less susceptible to theft or misplacement because the transmitter unit is located within the armrest and is thus out of view. Moreover, because the transmitter unit is located away from the front window of the vehicle, the battery that provides power for the transmitter unit is less affected by environmental conditions.

We claim:

1. An armrest for a vehicle seat, said armrest comprising:

a foam body having a cavity therein and said cavity having an opening therein;

a trim material covering said foam body, said trim material having a flap that is located adjacent to said opening and that is movable between an open position in which access is provided through said opening to said cavity and a closed position in which said flap closes said opening to conceal said cavity; and said foam body and said trim covering forming a soft side portion on said armrest which is detachable into said cavity pressing said soft side portion.

2. The armrest of claim 1, wherein said trim material includes a main portion, and wherein said flap of trim material has a first edge connected to said main portion of said trim material and a second edge spaced from said first edge, and securing means for detachably securing said second edge to said main portion of said trim material when said flap is in said closed position.

3. The armrest of claim 2, wherein said securing means comprises hook and loop means.

4. The armrest of claim 1, wherein said opening of said cavity is located at the front of said armrest.

5. The armrest of claim 1, wherein said opening of said cavity is located at the side of said armrest.

6. The combination comprising:

an armrest for the front seat of a motor vehicle, said armrest including a foam body and trim material covering said foam body and said armrest having at least one soft side, said foam body of said armrest having a cavity molded therein, said cavity having an opening;

a transmitter unit for a garage door opening system, said transmitter unit having an operating switch; and a cassette including means for supporting said transmitter unit, said cassette and said transmitter unit forming a transmitter assembly that is positionable as a unit within said cavity;

said trim material having a portion defining a cover that is located adjacent to said opening and that is movable between an open position in which access is provided through said opening to said cavity and a closed position in which said cover closes said opening to conceal said transmitter assembly within said armrest;

said cassette locating said transmitter unit within said cavity with said operating switch located at said soft side of said armrest to permit said operating switch of said transmitter unit to be operated through the armrest by squeezing the armrest in the proximity of said operating switch.

* * * * *